United States Patent
Cain et al.

(10) Patent No.: US 7,394,826 B2
(45) Date of Patent: *Jul. 1, 2008

(54) MOBILE AD HOC NETWORK (MANET) PROVIDING QUALITY-OF-SERVICE (QOS) BASED UNICAST AND MULTICAST FEATURES

(75) Inventors: Joseph Bibb Cain, Indialantic, FL (US); Richard Charles Bernhardt, Melbourne, FL (US); William Anthony Windham, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 839 days.

This patent is subject to a terminal disclaimer.

(21) Appl. No.: 10/658,021

(22) Filed: Sep. 9, 2003

(65) Prior Publication Data

US 2005/0053094 A1 Mar. 10, 2005

(51) Int. Cl.
*H04J 3/16* (2006.01)
*H04Q 7/24* (2006.01)
*H04L 12/28* (2006.01)

(52) U.S. Cl. .............. 370/469; 370/349; 370/230.1; 370/312; 370/390; 370/278; 455/450

(58) Field of Classification Search .......... 370/230.1, 370/231–238, 255, 278, 282, 312, 315, 322, 370/328, 335–338, 342–345, 347–349, 389–390, 370/469; 455/421, 403, 445, 453, 436, 450, 455/469, 452.2

See application file for complete search history.

(56) References Cited

U.S. PATENT DOCUMENTS 5,412,654 A 5/1995 Perkins .................. 370/94.1
5,581,703 A 12/1996 Baugher et al. .......... 395/200.6

(Continued)

FOREIGN PATENT DOCUMENTS

KR 2002-0059296 7/2002

OTHER PUBLICATIONS

Zhu, *Medium Access Control and Quality-of-Service Routing for Mobile Ad Hoc Networks*, PhD thesis, Department of Computer Engineering, University of Maryland, College Park, MD, 2001.

(Continued)

*Primary Examiner*—Chi Pham
*Assistant Examiner*—Ahmed Elallam
(74) *Attorney, Agent, or Firm*—Allen Dyer Doppelt Milbrath & Gilchrist

(57) ABSTRACT

A mobile ad hoc network (MANET) may include a plurality of mobile nodes each including a wireless communications device and a controller connected thereto. The controller may operate in accordance with a multi-layer protocol hierarchy. More particularly, at an upper protocol layer, the controller may establish a quality-of-service (QoS) threshold. Furthermore, at least one intermediate protocol layer below the upper protocol layer, the controller may select between unicast and multicast communications modes based upon the QoS threshold. As such, at a lower protocol layer below the at least one intermediate protocol layer, the controller may cooperate with the wireless communications device to transmit data to at least one destination mobile node based upon the selected communications mode.

27 Claims, 6 Drawing Sheets

U.S. PATENT DOCUMENTS

| | | | | |
|---|---|---|---|---|
| 5,884,174 | A | 3/1999 | Nagarajan et al. | 455/436 |
| 5,987,011 | A | 11/1999 | Toh | 370/331 |
| 6,189,033 | B1 | 2/2001 | Jin et al. | 709/255 |
| 6,216,006 | B1 | 4/2001 | Scholefield et al. | 455/450 |
| 6,304,556 | B1 | 10/2001 | Haas | 370/254 |
| 6,335,927 | B1 | 1/2002 | Elliott et al. | 370/352 |
| 6,349,091 | B1 | 2/2002 | Li | 370/238 |
| 6,377,548 | B1 | 4/2002 | Chuah | 370/233 |
| 6,385,174 | B1 | 5/2002 | Li | 370/252 |
| 6,396,814 | B1 | 5/2002 | Iwamura et al. | 370/256 |
| 6,449,588 | B1 | 9/2002 | Bowman-Amuah | 703/21 |
| 6,456,599 | B1 | 9/2002 | Elliott | 370/254 |
| 6,473,467 | B1 | 10/2002 | Wallace et al. | 375/267 |
| H2051 | H | 11/2002 | Zhu et al. | 370/395.21 |
| 6,493,759 | B1 | 12/2002 | Passman et al. | 709/227 |
| 6,501,741 | B1 | 12/2002 | Mikkonen et al. | 370/310 |
| 6,515,972 | B1 | 2/2003 | Gage et al. | 370/328 |
| 6,522,628 | B1 | 2/2003 | Patel et al. | 370/230.1 |
| 6,535,498 | B1 | 3/2003 | Larsson et al. | 370/338 |
| 6,728,215 | B1 | 4/2004 | Alperovich et al. | |
| 6,807,154 | B1 * | 10/2004 | Malmgren et al. | 370/252 |
| 6,813,272 | B1 | 11/2004 | An et al. | |
| 6,847,678 | B2 * | 1/2005 | Berezdivin et al. | 375/146 |
| 6,985,465 | B2 * | 1/2006 | Cervello et al. | 370/333 |
| 7,068,605 | B2 * | 6/2006 | Cain et al. | 370/235 |
| 7,079,552 | B2 * | 7/2006 | Cain et al. | 370/469 |
| 7,085,290 | B2 * | 8/2006 | Cain et al. | 370/469 |
| 7,126,928 | B2 * | 10/2006 | Tiedemann et al. | 370/329 |
| 7,171,169 | B2 * | 1/2007 | Habetha | 455/102 |
| 7,177,295 | B1 * | 2/2007 | Sholander et al. | 370/338 |
| 7,218,891 | B2 * | 5/2007 | Periyalwar et al. | 455/13.1 |
| 2001/0033556 | A1 | 10/2001 | Krishnamurthy et al. | 370/329 |
| 2002/0018448 | A1 | 2/2002 | Amis et al. | 370/255 |
| 2002/0080755 | A1 * | 6/2002 | Tasman et al. | 370/338 |
| 2002/0082035 | A1 | 6/2002 | Aihara et al. | 455/518 |
| 2002/0101822 | A1 | 8/2002 | Ayyagari et al. | 370/235 |
| 2002/0103893 | A1 | 8/2002 | Frelechoux et al. | 709/223 |
| 2002/0173271 | A1 | 11/2002 | Blair et al. | |
| 2003/0053424 | A1 | 3/2003 | Krishnamurthy et al. | 370/316 |
| 2003/0067941 | A1 | 4/2003 | Fall | 370/468 |
| 2003/0139187 | A1 * | 7/2003 | Zhang et al. | 455/445 |
| 2003/0161268 | A1 | 8/2003 | Larsson et al. | |
| 2003/0202477 | A1 * | 10/2003 | Zhen et al. | 370/248 |
| 2004/0018839 | A1 * | 1/2004 | Andric et al. | 455/433 |
| 2004/0023652 | A1 | 2/2004 | Shah et al. | |
| 2004/0146007 | A1 | 7/2004 | Saadawi et al. | |
| 2004/0156370 | A1 * | 8/2004 | Bush | 370/400 |
| 2004/0170127 | A1 | 9/2004 | Tanaka | |
| 2004/0190468 | A1 * | 9/2004 | Saijonmaa | 370/312 |
| 2004/0264372 | A1 * | 12/2004 | Huang | 370/230 |
| 2005/0128944 | A1 * | 6/2005 | Zhang et al. | 370/229 |
| 2006/0291434 | A1 * | 12/2006 | Gu et al. | 370/338 |

OTHER PUBLICATIONS

Mirhakkak et al., *Dynamic Quality-of-Service for Mobile Ad Hoc Networks*, MITRE Corp., 2000.

Das et al., *Routing in Ad-Hoc Networks Using Minimum Connected Dominating Sets*, IEEE Int. Conf. On Commun. (ICC '97), 1997.

Das et al., *Routing in Ad-Hoc Networks Using a Spine*, IEEE Int. Conf. On Computer Commun. and Networks (IC3N '97), 1997.

Raghunathan et al., *Gateway Routing: A Cluster Based Mechanism for Recovery from Mobile Host Partitioning in Cellular Networks*, Proceedings of the 3rd IEEE Symposium on Application-Specific Systems and Software Engineering Technology (ASSET'00), 2000.

Krishna et al., *A Cluster Based Approach for Routing in Dynamic Networks*, ACM Computer Communications Review, 27(2), Apr. 1997.

Chiang, *Routing in Clustered Multihop, Mobile Wireless Networks with Fading Channel*, Proceedings of IEEE SICON '97, Apr. 1997, pp. 36-45.

Gerla, *Clustering and Routing in Large Ad Hoc Wireless Nets*, Computer Science Department, University of California, Los Angeles, Final Report 1998-99 for MICRO project 98-044.

Van Dyck et al., *Distributed Sensor Processing Over an Ad-Hoc Wireless Network: Simulation Framework And Performance Criteria*, Proceedings IEEE Milcom, Oct. 2001.

Lin et al., Adaptive Clustering for Mobile Wireless Networks, *IEEE Journal on Selected Areas in Communications*, 15(7), Sep. 1997.

McDonald, *PhD. Dissertation Proposal: A Mobility-Based Framework for Adaptive Dynamic Cluster-Based Hybrid Routing in Wireless Ad-Hoc Networks*, University of Pittsburgh, 1999.

Royer et al., *A Review of Current Routing Protocols for Ad Hoc Mobile Wireless Networks*, IEEE Personal Communications, Apr. 1999, pp. 46-55.

Corson et al., *A Reservation-Based Multicast (RBM) Routing Protocol for Mobile Networks: Initial Route Constructions Phase*, ACM/I. 1, No. 4, 1995, pp. 1-39.

Xiao et al., *A Flexible Quality of Service Model for Mobile Ad Hoc Networks, IEEE VTC2000-spring*, Tokyo, Japan, May 2000.

Corson et al., *Mobile Ad Hoc Networking (MANET): Routing Protocol Performance Issues and Evaluation Considerations*, Network Working Group, Internet Engineering Task Force (IETF) MANET Working Group, Internet Draft, Jan. 1999.

Haas et al., *The Bordercast Resolution Protocol (BRP) for Ad Hoc Networks*, Internet Engineering Task Force (IETF) MANET Working Group, Internet Draft, Jun. 2001.

Haas et al., *The Interzone Routing Protocol (IERP) for Ad Hoc Networks*, Internet Engineering Task Force (IETF) MANET Working Group, Internet Draft, Jun. 2001.

Haas et al., *The Intrazone Routing Protocol (IERP) for Ad Hoc Networks*, Internet Engineering Task Force (IETF) MANET Working Group, Internet Draft, Jun. 2001.

Clausen et al., *Optimized Link State Routing Protocol*, Internet Engineering Task Force (IETF) MANET Working Group, Internet Draft, Oct. 31, 2001.

Perkins et al., *Quality of Service in Ad hoc On-Demand Distance Vector Routing*, Internet Engineering Task Force (IETF) MANET Working Group, Internet Draft, Jul. 2000.

Park et al., *Temporally-Ordered Routing Algorithm (TORA) Versoin 1 Functional Specification*, Internet Engineering Task Force (IETF) MANET Working Group, Internet Draft, Jul. 20, 2001.

Ogier et al., *Topology Broadcast Based on Reserve-Path Forwarding (TBRPF)*, Internet Engineering Task Force (IETF) MANET Working Group, Internet Draft, Jan. 10, 2002.

Gerla et al., *Landmark Routing Protocol (LANMAR) for Large Scale Ad Hoc Networks*, Internet Engineering Task Force (IETF) MANET Working Group, Internet Draft, Dec. 17, 2001.

Hu et al., *Flow State in the Dynamic Socurce Routing Protocol for Mobile Ad Hoc Networks*, Internet Engineering Task Force (IETF) MANET Working Group, Internet Draft, Feb. 23, 2001.

Gerla et al., *Fisheye State Routing Protocol (FSR) for Ad Hoc Networks*, Internet Engineering Task Force (IETF) MANET Working Group, Internet Draft, Dec. 17, 2001.

Johnson et al., *The Dynamic Source Routing Protocol for Mobile Ad Hoc Networks (DSR)*, Internet Engineering Task Force (IETF) MANET Working Group, Internet Draft, Nov. 21, 2001.

Perkins et al., *Ad hoc On-Demand Distance Vector (ADOV) Routing*, Internet Engineering Task Force (IETF) MANET Working Group, Internet Draft, Nov. 9, 2001.

Chakrabarti et al., "QoS Issues in Ad Hoc Wireless Networks", , IEEE Communications Magazine, (Feb. 2001), pp. 142-148.

Chen, "Routing Support for Providing Guaranteed End-to-End Quality-of-Service", Ph.D. thesis, Univ. of Illinois at Urbana-Champaign, http://cairo.cs.uiuc.edu/papers/Scthesis.ps, 1999.

Jin et al., *A Hierarchical Routing Protocol for Large Scale Ad Hoc Network*, IEEE 1999, pp. 379-385.

Gerla et al., *Multicluster, Mobile, Multimedia Radio Network*, Wireless Networks I, 1995, pp. 255-265.

Chiang et al., "Admission Control, Power Control and QoS Analyses for Ad Hoc Wireless Networks", IEEE, 2000, pp. 445-449.

Dong et al., "Effective Admission Control in Multihop Mobile Ad Hoc Networks", Communication Technology Proceedings, International Conference, Apr. 9-11, 2003, vol. 2, pp. 1291-1294.

Laboid et al., QoS-ASR: An Adaptive Source Routing Protocol with QoS Support in Multihop Mobile Wireless Networks, IEEE, 2002, pp. 1978-1982.

Kui Wu et al., "QoS Support in Mobile Ad Hoc Networks", University of Alberta, Crossing Boundaries—an interdisciplinary journal, vol. 1, No. 1, Fall 2001.

* cited by examiner

MOBILE AD HOC NETWORK (MANET) PROVIDING QUALITY-OF-SERVICE (QOS) BASED UNICAST AND MULTICAST FEATURES

FIELD OF THE INVENTION

The present invention relates to the field of communications networks, and, more particularly, to mobile ad hoc networks and related methods.

BACKGROUND OF THE INVENTION

Wireless networks have experienced increased development in the past decade. One of the most rapidly developing areas is mobile ad hoc networks (MANETs). Physically, a MANET includes a number of geographically distributed, potentially mobile nodes sharing one or more common radio channels. Compared with other types of networks, such as cellular networks or satellite networks, the most distinctive feature of MANETS is the lack of any fixed infrastructure. The network is formed of mobile (and potentially stationary) nodes, and is created on the fly as the nodes communicate with each other. The network does not depend on a particular node and dynamically adjusts as some nodes join or others leave the network.

In a hostile environment where a fixed communication infrastructure is unreliable or unavailable, such as in a battle field or in a natural disaster area struck by earthquake or hurricane, a MANET can be quickly deployed to provide much needed communications. While the military is still a major driving force behind the development of these networks, ad hoc networks are quickly finding new applications in civilian or commercial areas. MANETs will allow people and applications to exchange data in the field or in a class room without using any network structure except that which they create by simply turning on their computers or PDAs.

As wireless communication increasingly permeates everyday life, new applications for MANETs will continue to emerge and become an important factor in wireless communications. Yet, MANETs pose serious challenges to designers. Due to the lack of a fixed infrastructure, nodes must self-organize and reconfigure as they move, join or leave the network. All nodes are essentially the same, and there is no natural hierarchy or central controller in the network. All functions have to be distributed among the nodes. Nodes are often powered by batteries and have limited communication and computation capabilities. Also, the bandwidth of the system is usually limited. The distance between two nodes often exceeds the radio transmission range, and a transmission may have to be relayed by other nodes before reaching its destination. Consequently, a MANET network typically has a multi-hop topology, and this topology changes as the nodes move around.

The MANET working group of the Internet Engineering Task Force (IETF) has been actively evaluating and standardizing routing protocols, including multicasting protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood and not far away from itself).

A routing protocol needs to adapt to frequent topology changes, possibly with less than accurate information. Because of these unique requirements, routing in these networks is very different than in others. Gathering fresh information about the entire network is often costly and impractical. Some routing protocols are reactive (i.e., on-demand) protocols. That is, they collect routing information only when necessary and only to destinations to which they need routes, and do not maintain unused routes. In this way the routing overhead may be reduced compared to pro-active protocols, which maintain optimal routes to all destinations at all time. Ad Hoc on Demand Distance Vector (AODV), Dynamic Source Routing (DSR) and Temporally Ordered Routing Algorithm (TORA) are representatives of reactive routing protocols presented at the MANET working group.

An example of a proactive routing protocol is found in Clausen et al. entitled "Optimized Link State Routing Protocol," Internet Engineering Task Force (IETF) MANET Working Group, Internet Draft, Oct. 31, 2001. Examples of other various routing protocols include Destination Sequenced Distance-Vector (DSDV) routing which is disclosed in U.S. Pat. No. 5,412,654 to Perkins, and the Zone Routing Protocol (ZRP) which is disclosed in U.S. Pat. No. 6,304,556 to Haas. ZRP is a hybrid protocol using both proactive and reactive approaches.

These conventional routing protocols use a best effort approach in selecting a route from the source node to the destination node. Typically, minimizing the number of hops is the main criteria in such approaches.

Quality-of-service (QoS) routing in MANETs is gaining interest. To provide quality-of-service, a protocol needs not only to find a route but also to identify and/or secure the resources along the route. Because of the potentially limited, shared bandwidth of the network, and the lack of a central controller which can account for and control these limited resources, nodes must negotiate with each other to manage the resources required for QoS routes. This is further complicated by frequent topology changes. Due to these constraints, QoS routing is more demanding than best-effort or minimum-hop routing.

Some examples of QoS routing approaches are set forth by Chenxi Zhu in the publication entitled "Medium Access Control and Quality-of-Service Routing for Mobile Ad Hoc Networks," 2001, and by M. Mirhakkak et al. in the publication entitled "Dynamic Quality-of-Service for Mobile Ad Hoc Networks," MITRE Corp., 2000. Zhu discusses establishing bandwidth guaranteed QoS routes in small networks whose topologies change at a low to medium rate. Mirhakkak et al. are concerned with resource reservation requests that specify a range of QoS values while the network makes a commitment to provide service within this range.

Since MANETs are still in the initial stages of development, most attempts to implement QoS functionality in MANETs thus far have focused primarily on using QoS parameters to establish routes, as is the case with the above-noted prior art approaches. Yet, as MANETs continue to increase in size and complexity, further QoS functionality may be needed along with ways to efficiently distribute QoS operations among different network protocol hierarchy layers.

SUMMARY OF THE INVENTION

In view of the foregoing background, it is therefore an object of the present invention to provide a MANET that provides quality-of-service (QoS) based unicast and multicast communications and related methods.

This and other objects, features, and advantages in accordance with the present invention are provided by a mobile ad hoc network (MANET) that may include a plurality of mobile nodes each including a wireless communications device and a controller connected thereto. The wireless communications device may provide a selectable signal transmission pattern for implementing unicast and multicast transmissions. Further, the controller may operate in accordance with a multi-layer protocol hierarchy. More particularly, at an upper protocol layer, the controller may establish a quality-of-service (QoS) threshold for data transmission.

Furthermore, at least one intermediate protocol layer below the upper protocol layer, the controller may select between a unicast communications mode and a multicast communications mode based upon the QoS threshold. As such, at a lower protocol layer below the at least one intermediate protocol layer, the controller may cooperate with the wireless communications device to transmit data to the at least one destination mobile node via the at least one selected route based upon the selected communications mode. Thus, the controller may advantageously tailor signal transmission characteristics not only based upon QoS parameters, but also based upon the specific communications mode required for a given transmission.

Furthermore, at the at least one intermediate protocol layer, the controller may select at least one route to the at least one destination mobile node based upon the QoS threshold. As such, the controller may also, at the lower protocol layer, cooperate with the wireless communications device to transmit the data to the at least one destination mobile node via the at least one selected route.

In addition, at the at least one intermediate protocol layer, the controller may determine whether to require data reception acknowledgements (i.e., Acks or Naks) based upon the QoS threshold. At the lower protocol layer, the controller may also cooperate with the wireless communications device to determine a QoS metric for the at least one selected route and, at the at least one intermediate protocol layer, determine whether the QoS metric falls below the QoS threshold.

Accordingly, at the lower protocol layer, the controller may cooperate with the wireless communications device to change at least one signal characteristic based upon a determination that the QoS metric has fallen below the QoS threshold. By way of example, the at least one signal characteristic may be power, gain, and/or signal pattern. Thus, by adjusting such signal characteristics, the controller may advantageously increase signal connectivity with adjacent nodes, or reduce signal interference.

Similarly, at the at least one intermediate protocol layer, the controller may encode data prior to transmission. As such, the controller may also change the encoding based upon a determination that the QoS metric has fallen below the QoS threshold. Moreover, at the lower protocol layer, the controller may cooperate with the wireless communications device to modulate the data using a first modulation technique if the QoS metric is greater than or equal to the QoS threshold, and otherwise use a second modulation technique.

Further, at the lower protocol layer, the controller may cooperate with the wireless communications device to transmit data at a data rate. Thus, the controller may also cooperate with the wireless communications device to change the data rate based upon a determination that the QoS metric has fallen below the QoS threshold. Here again, this may also be done to increase node connectivity or decrease interference.

By way of example, the upper protocol layer may be an application layer. Furthermore, the at least one intermediate protocol layer may include at least one of a session layer, a transport layer, a network layer, and a radio transport layer. Additionally, the lower protocol layer may be a physical layer. Also, the QoS threshold may be based upon at least one of available bandwidth, error rate, end-to-end delay, end-to-end delay variation, hop count, expected path durability, and priority, for example.

A method aspect of the invention is for operating a mobile node in a MANET, such as the one described briefly above. The method may include, at an upper protocol layer, establishing a quality-of-service (QoS) threshold. Moreover, the method may further include, at least one intermediate protocol layer below the upper protocol layer, selecting between a unicast communications mode and a multicast communications mode based upon the QoS threshold. In addition, the method may also include, at a lower protocol layer below the at least one intermediate protocol layer, causing the wireless communications device to transmit data to at least one destination mobile node based upon the selected communications mode.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternate embodiments.

Figure 1:
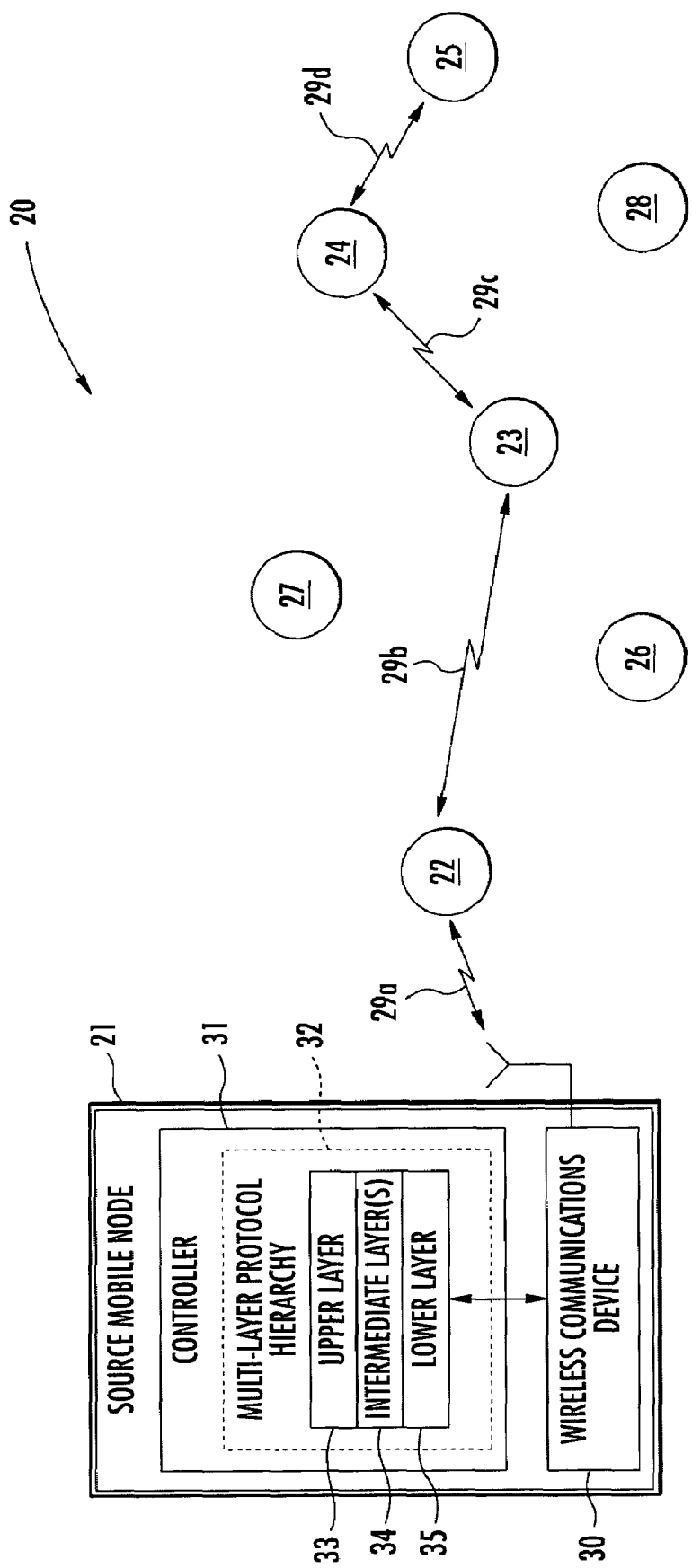
FIG. 1 is schematic block diagram of a MANET in accordance with the present invention.

Referring initially to FIG. 1, a MANET 20 in accordance with the present invention illustratively includes a plurality of mobile nodes 21-28. In the illustrated example, the mobile node 21 functions as a source node, while the mobile node 25 functions as a destination node with which the source node seeks to communicate. The nodes 21-28 may be any suitable type of mobile device capable of communicating within a MANET such as computers, personal data assistants (PDAs), etc., including a wireless communications device 30, for example, and other devices which will be appreciated by those of skill in the art. Of course, it will also be appreciated that certain of the nodes 21-28 may optionally be connected to a fixed communication infrastructure in some applications, if desired.

The source mobile node 21 further illustratively includes a controller 31, the operation of which will be described below. By way of example, the controller 31 may be implemented using microprocessors, memory, software, etc., as will be appreciated by those of skill in the art. Furthermore, the wireless communications device 30 may include wireless modems, wireless local area network (LAN) devices, cellular telephone devices, etc., as well as an associated antenna(s), as illustratively shown. By way of example, one or more phased array antennas (as well as other suitable antennas) may be used, as will be appreciated by those skilled in the art. It will further be understood that the mobile nodes 23-28 also preferably include suitable wireless communications devices/controllers as well, which are not shown in FIG. 1 for clarity of illustration.

One function that the controller 31 performs is to establish one or more routes between the source mobile node 21 and the destination mobile node 25 for transferring data therebetween. A single route is illustratively shown in the exemplary embodiment that passes through mobile nodes 22-24 and includes wireless communications links 29a-29d. It should be noted that while only a single route is shown for clarity of illustration, any number of routes may be used in accordance with the present invention.

As will be appreciated by those skilled in the art, MANET routes may include any number of intermediate nodes therein depending upon network size and proximity between the nodes, for example. Each intermediate node along a route is typically referred to as a "hop," thus routes passing through multiple intermediate nodes are sometimes referred to as "multi-hop" routes. It should be noted that while a relatively few number of intermediate nodes 22-24 are shown in the present example for clarity of illustration, the MANET 20 may include any number of nodes therein. Furthermore, it will be appreciated that portions of the route to the destination mobile node 25 could also include wired infrastructure.

It will also be appreciated that the way in which the controller 31 establishes routes will depend upon the particular MANET routing protocol being implemented in the MANET 20. As noted above, this may be done using proactive protocols that keep routing information continuously up to date, reactive protocols which discover routes on-demand when there is a need to send data to the destination node 22, or by a combination thereof. Any suitable MANET protocols may be used in accordance with the present invention to establish routes, such as those previously discussed above, for example.

While MANETs are still in their relative infancy and no universal standards have as yet been adopted, data communications within MANETS will likely follow the open system interconnection (OSI) architecture (or some variation thereof), as do other wireless networks (e.g., wireless LANs). By way of background, the OSI is a network protocol hierarchy which includes seven different control layers, namely (from highest to lowest) the application layer, presentation layer, session layer, transport layer, network layer, data link layer, and physical layer.

Generally speaking, in the OSI model control is passed from one layer to the next at an originating node or terminal starting at the application layer and proceeding to the physical layer. The data is then sent across the network, and when it reaches the destination terminal/node, it is processed in reverse order back up the hierarchy (i.e., from the physical layer to the application layer). Furthermore, data corresponding to each particular layer is typically organized in protocol data units (PDUs) referred to as packets at the network level.

In accordance with the present invention, the controller 31 similarly operates in accordance with a multi-layer protocol hierarchy 32 to provide an integrated framework for QoS operations. Generally speaking, the multi-layer protocol hierarchy includes an upper protocol layer 33, one or more intermediate protocol layers 34, and a lower protocol layer 35 over which complementary QoS operations are performed to provide enhanced QoS functionality.

Figure 2:
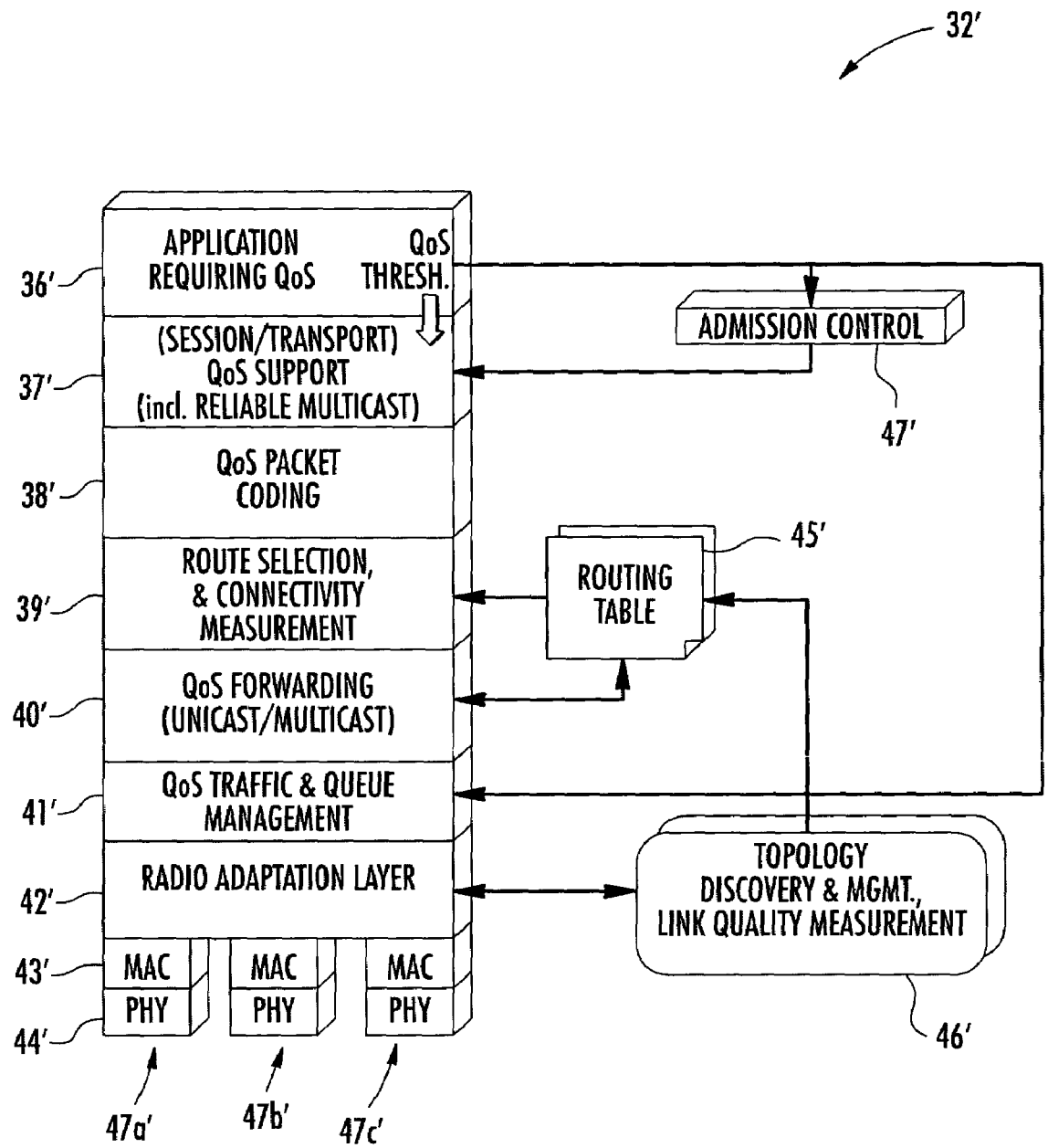
FIG. 2 is a schematic block diagram of an alternate embodiment of the multi-layer protocol hierarchy implemented in the MANET of FIG. 1.
Figure 8:
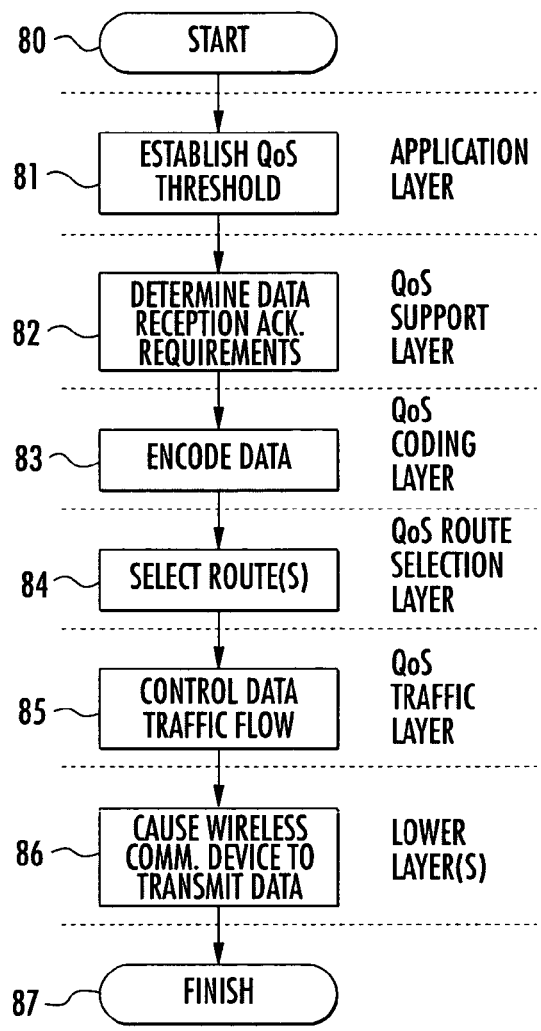
FIGS. 8-11 are flow diagrams illustrating methods for operating a mobile node in a MANET in accordance with the present invention.
Figure 9:
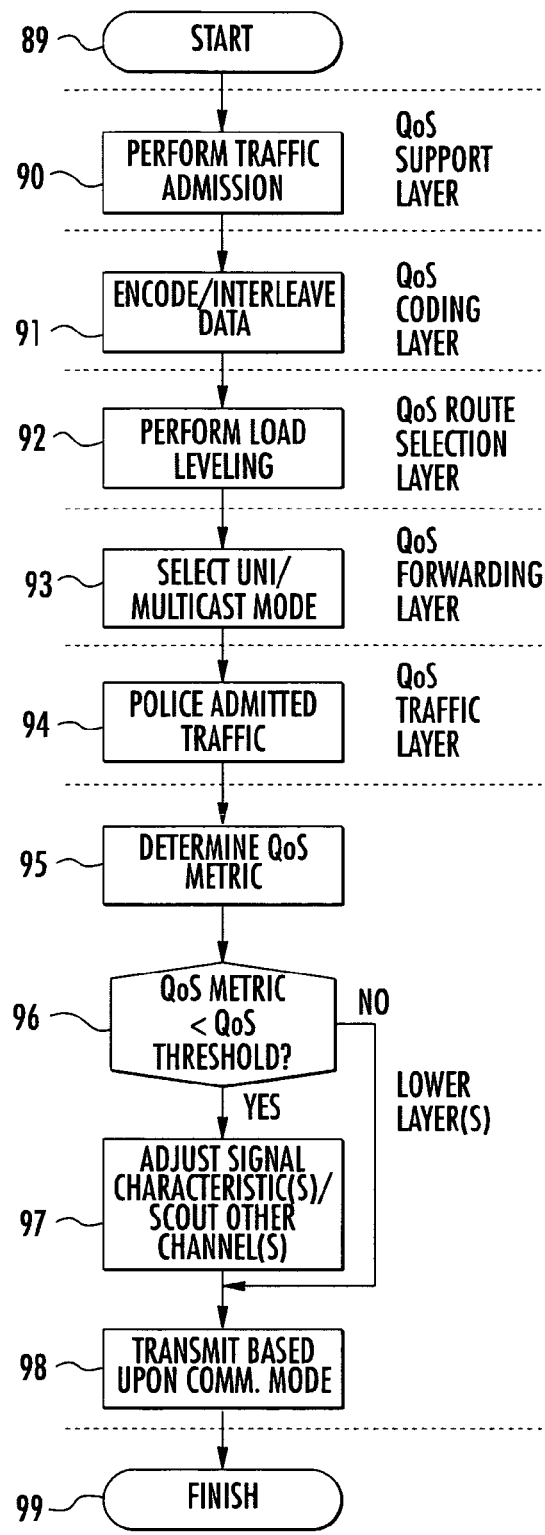
Figure 10:
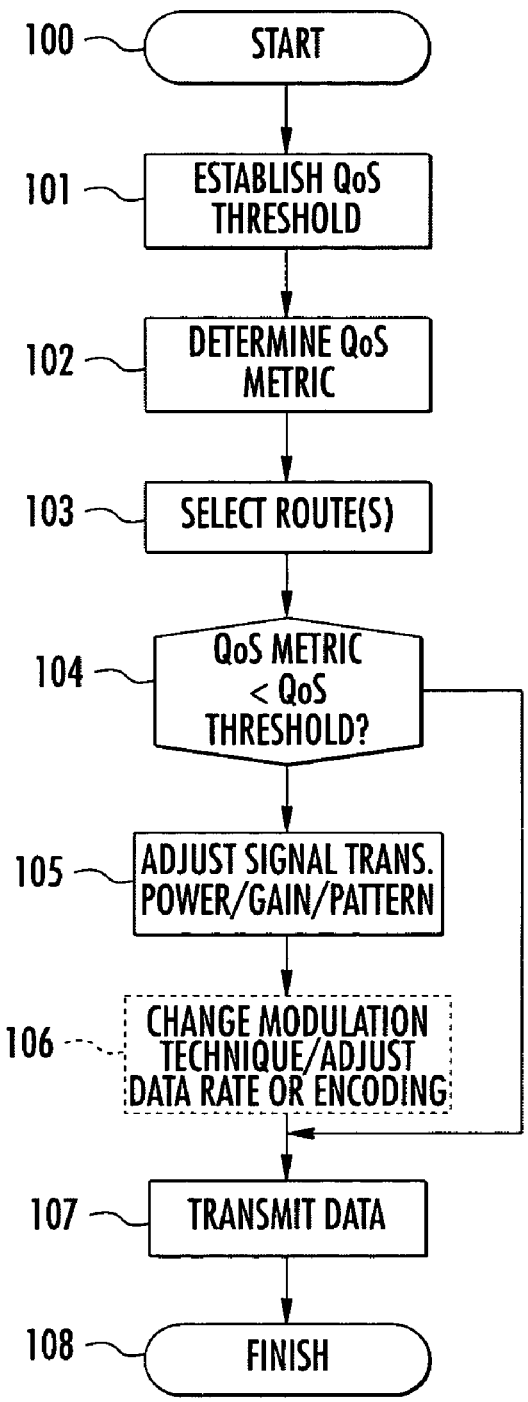

More particularly, an exemplary embodiment of the multi-layer protocol hierarchy 32' is illustratively shown in FIG. 2, and related methods for using the same are illustrated in FIGS. 8 and 9. It should be noted that the various protocol layers at which the method steps illustrated in FIGS. 8 and 9 are performed are illustratively shown with dashed lines and labeled for clarity of illustration and understanding. In accordance with the multi-layer protocol hierarchy 32', beginning at Block 80, the controller 31 may, at an application layer 36', establish a quality-of-service (QoS) threshold for data transfer across the MANET 20 (Block 81). More particularly, the application layer 36' is preferably the layer at which the data to be transmitted is created or processed.

The QoS threshold (or type of service, TOS) will vary depending upon the particular application that is being run at this upper layer. For example, time sensitive data, such as video or audio data, may require a greater QoS threshold to maintain the integrity thereof than text data files. One common way to define the QoS threshold required for a particular application is by the total end-to-end delay that can be tolerated for data transmissions. However, numerous other QoS parameters may be used in accordance with the present invention for defining a QoS threshold. For example, such parameters may include one or more of available bandwidth, error rate, end-to-end delay variation, hop count, expected path durability, priority, etc., as will be appreciated by those skilled in the art.

At a QoS support layer 37' below the application layer 36', the controller 31 determines whether to require data reception acknowledgements based upon the QoS threshold and mode, at Block 82. That is, in some circumstances it will be desirable to have receiving mobile nodes acknowledge ("Ack") receipt of transmitted data, and/or inform the source mobile node 21 when correct receipt of the data cannot be acknowledged ("Nack"), as will be appreciated by those skilled in the art. The QoS support layer 37' may conceptually be thought of as a session and/or transport layer with respect to the OSI model, as illustratively shown in FIG. 2.

Data packet reception acknowledgement may be particularly useful, for example, when the source mobile node 21 needs to perform a "reliable" multicast operation to adjacent nodes. By way of example, if the mobile nodes are organized into clusters or groups and the source mobile node 21 serves as a cluster leader node, it may need to send updated network topology information or other control data to the other nodes in its cluster. Thus, the source mobile node 21 can request that these nodes acknowledge receipt of this important data. Of course, data acknowledgements can be used in many other circumstances as needed based upon the importance of the data and the overhead that will be required for the extra Ack/Nack transmissions.

Moreover, another particularly advantageous function that may be performed at the QoS support layer 37' is high-level admission control. More particularly, beginning at block 89 (FIG. 9), the controller 31 may determine whether to admit traffic from other mobile nodes based upon respective QoS route requests received therefrom and an internal QoS metric for the source node 21. That is, the controller 31 essentially determines what type of traffic that it can presently support based upon its own QoS requirements/resources and those of other mobile nodes requesting access to the resources of the source node 21.

By way of example, the internal QoS metric may include one or more of available power, available bandwidth, recent error rate, and recent delay. For clarity of illustration, the admission control operations are shown as being performed in a block 47' separate from the QoS support layer 37' in FIG. 2. However, some or all of these operations may be performed by the same controller or processor at the QoS support layer 37' (although they could be performed by separate processors and at other layers as well). Further details regarding such admission control operations are provided in co-pending U.S. application Ser. No. 10/134,173 filed Apr. 29, 2002, now U.S. Pat. No. 7,007,102 issued Feb. 28, 2006 and assigned to the present Assignee, which is hereby incorporated herein in its entirety by reference.

At a QoS packet coding layer 38' below the QoS support layer 37', the controller 31 encodes data from the application layer 36' for transmission to the destination mobile node (or nodes) 25, at Block 83. Of course, it will be appreciated by those of skill in the art that data packets received from other mobile nodes to be used by the controller 31 of the application layer 36' may also be decoded at the QoS packet coding layer 38' as well as using a complementary decoding algorithm to the encoding algorithm used by a sending mobile node.

One particularly advantageous coding approach is for the controller 31 to encode data using a forward error correction (FEC) algorithm to generate error correction data for the data based upon the QoS threshold. Moreover, the controller 31 may also select a plurality of routes for transmitting data to the destination mobile node 25. In such case, the controller 31 may advantageously interleave the error correction data and the data packets to be transmitted and distribute the interleaved data across the plurality of selected routes, at Block 91.

By performing FEC and distributing the interleaved data across a plurality of routes, the MANET thus allows corrupted data packets to be corrected even when one of the routes is lost, allowing transmission to continue while a new route is established, if necessary. Moreover, the additional amount of data associated with the FEC encoding may be spread across the plurality of routes, thus mitigating the increased bandwidth requirements. Further details regarding the FEC/interleaving operations that may be performed at the QoS packet coding layer 38' are provided in co-pending U.S. application Ser. No. 10/369,313 filed Feb. 19, 2003, now U.S. Pat. No. 7,216,282 issued May 8, 2007 and assigned to the present assignee, which is hereby incorporated herein in its entirety by reference.

Route selection may be performed at a QoS route selection layer 39' below the QoS coding layer 38', at Block 84. Generally speaking, the controller 31 causes QoS route requests to be sent to adjacent mobile nodes to discover potential routes to a desired destination mobile node (or nodes). Route confirmations are then returned to the source mobile node 21 which include an indication or metric of what QoS level(s) the route can support or provide. A list of available routes may then be stored in a routing table 45', from which the controller 31 selects a desired route(s) based upon a routing algorithm. Several particularly advantageous approaches for establishing and sending data across one or more routes within a MANET are described in co-pending U.S. application Ser. No. 10/214,997 filed Aug. 8, 2002, now U.S. Pat. No. 6,961,310 issued Nov. 1, 2005, co-pending U.S. application Ser. No. 10/174,721 filed Jun. 19, 2002, and a co-pending U.S. application Ser. No. 10/657,960 filed Sep. 9, 2003, now abandoned, all of which are assigned to the present Assignee and are hereby incorporated herein in their entireties by reference.

Furthermore, at Block 92, the controller 31 may optionally perform load-leveling at the QoS route selection layer 39' on outgoing data based upon the QoS threshold and an energy usage level (i.e., power) required to transmit the outgoing data. This advantageously allows power consumption, available QoS, and the QoS required by a given application to be appropriately balanced for a given situation. Further details regarding load-leveling operations are provided in a co-pending application Ser. No. 10/657,959 filed Sep. 9, 2003, now U.S. Pat. No. 7,142,866 issued Nov. 28, 2006, which is hereby incorporated herein in its entirety by reference.

In addition, at a QoS forwarding layer 40' below the QoS route selection layer 39', the controller 31 preferably selects between a unicast communications mode and a multicast communications mode, at Block 93. More particularly, the controller 31 may dictate at the application layer 36' the particular type of communications mode to be selected at the QoS forwarding layer 40' for a given application (e.g., reliable multicast communications for cluster leader node broadcasts).

For other applications, a particular communications mode may not necessarily be specified at the application layer 36'. As such, the controller 31 may determine which communications mode is appropriate based upon the QoS threshold. Of course, this determination may also take into account other factors, such as availability of particular wireless communications device 30 resources, whether a particular type of transmission is likely to cause unintended interference with other mobile nodes, etc. In particular, even if a particular communications mode has been specified at the application layer 36', the controller may determine at the QoS forwarding layer 40' that based upon one or more of the above-noted factors a different communications mode should be used.

Furthermore, at a QoS traffic layer 41' below the QoS forwarding layer 40', the controller 31 preferably controls data traffic flow and may also manage its data queue(s) to maintain the QoS threshold, at Block 85. In particular, in one advantageous embodiment the above-noted QoS route requests may have respective traffic flow identifiers and second QoS thresholds or ceilings associated therewith. As such, the controller 31 may advantageously police admitted traffic based upon respective traffic flow identifiers to ensure that the admitted traffic does not exceed respective second QoS thresholds, at Block 94. Further details regarding such traffic policing is provided in co-pending U.S. application Ser. No. 10/134,714 filed Apr. 29, 2002, now U.S. Pat. No. 7,068,600 issued Jun. 27, 2006 assigned to the present Assignee, which is hereby incorporated herein in its entirety by reference.

Further, at least one lower protocol layer below the QoS traffic layer 41', the controller 31 cooperates with the wireless communications device 30 to transmit data to the destination mobile node 25 via the selected route(s) based upon the commands/data provided from the higher layers, as will be appreciated by those skilled in the art, thus concluding the method illustrated in FIG. 8 (Block 87).

Further, when unicast and multicast modes are both implemented by the controller 31, the controller may advantageously cooperate with the wireless communications device 30 to transmit the data based upon the particular communications mode selected. That is, various signal transmission characteristics may be adjusted or tailored depending upon the particular type of communications mode that is being used, as well as QoS metrics for the selected route(s), at Blocks 95-98, thus concluding the method illustrated in FIG.

9 (Block 99). Adjustment of signal transmission and reception characteristics will be discussed further below.

More specifically, the lower protocol layers of the hierarchy 32' preferably include a radio adaptation layer 42' below the QoS traffic layer 41', a media access (MAC) layer 43' below the radio adaptation layer, and a physical (PHY) layer 44' below the MAC layer. The radio adaptation layer 42' provides an interface between the upper protocol layers and the MAC and PHY layers, the latter of which is where the controller 31 physically interfaces with the wireless communications device 30. Of course, it will be appreciated by those skilled in the art that other layers may be included within the hierarchy 32' as well, such as a link layer, for example, and that certain of the functions described herein may be implemented at different layers in certain embodiments.

Accordingly, at the physical layer 44', the controller 31 preferably cooperates with the wireless communications device 30 to determine a QoS metric for the selected route(s), at Block 95, which may be used to determine whether any QoS adjustments need to be made, or whether communications are simply no longer possible over the route. It will also be appreciated that QoS metrics are not only used for maintaining a QoS for an established route, but they are also typically used for route discovery and selection, which is illustratively shown in FIG. 2 by the operational block 46'. Again, it should be noted that although the block 46' is shown separate from the radio adaptation layer 42' for clarity of illustration, the operations illustrated therein may in fact be performed at the radio adaptation layer (or other layers).

By monitoring the QoS metric for a selected route, the controller 31 at the QoS route selection layer 39' may determine if the QoS metric falls below the QoS threshold, at Block 96. If it does, at the physical layer 44', the controller 31 may cooperate with the wireless communications device 30 to adjust one or more signal characteristics to improve the QoS metric, at Block 97.

Referring now additionally to FIGS. 3-7 and 10-11, specific examples of how signal characteristics can be adjusted to improve QoS will now be described. A first example is when the QoS metric indicates that signal connectivity to a desired mobile node, such as a next mobile node along a selected route, has diminished to an undesirable level (e.g., below the QoS threshold).

Figure 3:
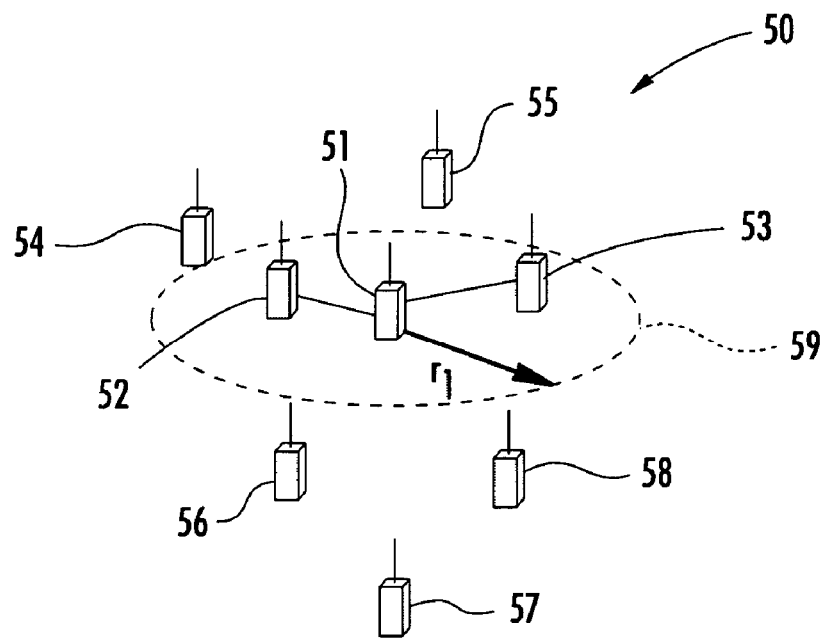
FIGS. 3 and 4 are schematic block diagrams illustrating a MANET before and after adjusting signal transmission power in accordance with the invention to increase signal connectivity, respectively.
Figure 4:
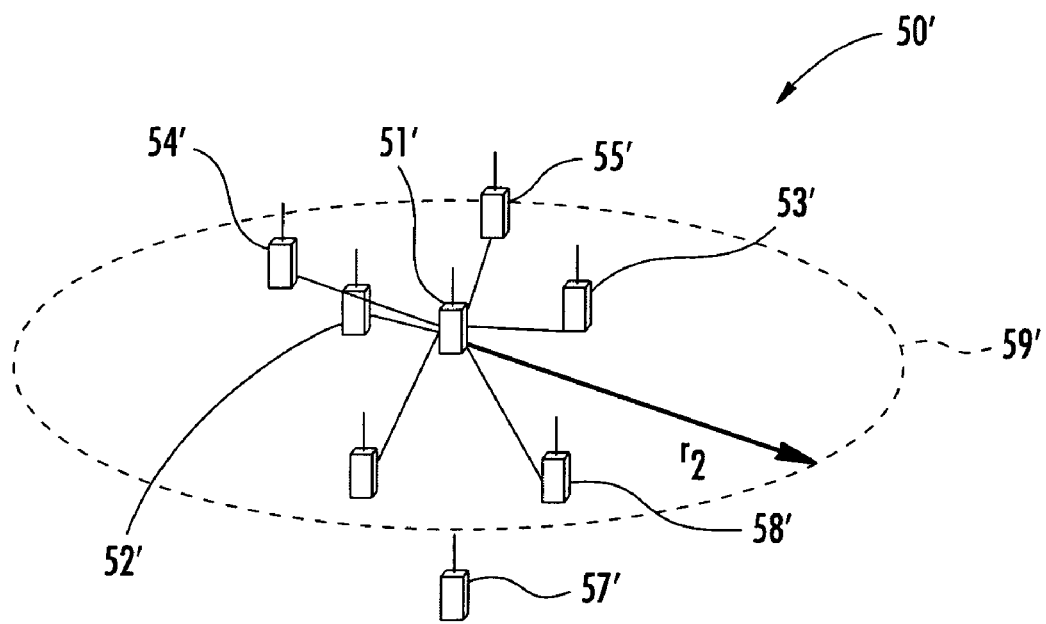
Figure 5:
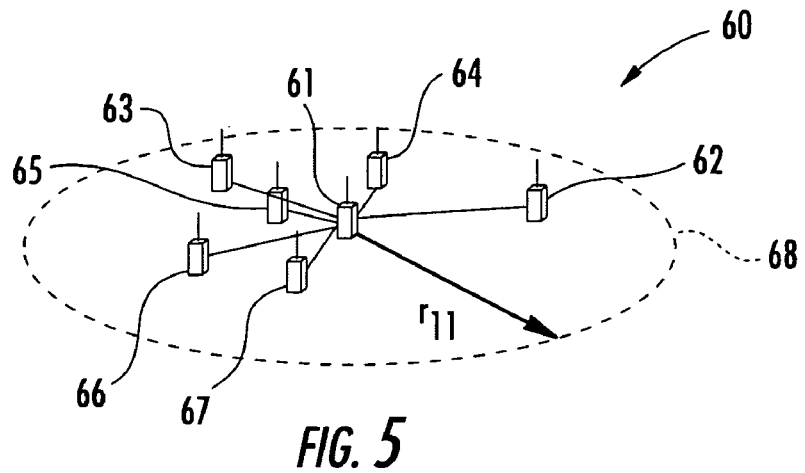
FIGS. 5 and 6 are schematic block diagrams illustrating a MANET before and after adjusting signal transmission power at a source mobile node in accordance with the invention to decrease signal interference at an adjacent mobile node, respectively.
Figure 6:
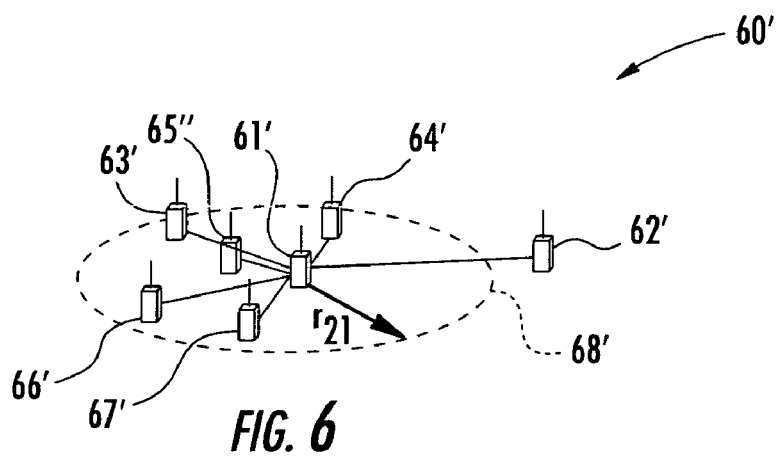
Figure 7:
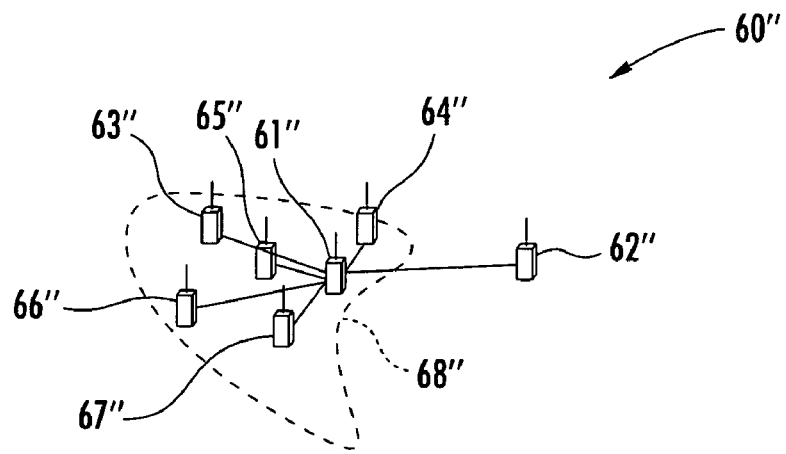
FIG. 7 is a schematic block diagram of the MANET of FIG. 5 after adjusting a signal transmission antenna pattern at a source mobile node in accordance with the invention to similarly reduce interference at an adjacent mobile node.

With respect to the MANET 50 illustrated in FIG. 3, which includes a source mobile node 51 and mobile nodes 52-58 adjacent thereto, the source mobile node transmits over an area 59 defined by the radius $r_1$. Thus, after establishing the QoS threshold, determining the QoS metric and selecting the desired route(s) (Blocks 100-103) as described above, when it is determined that the QoS metric has fallen below the QoS threshold (Block 104), the controller 31 cooperates with the wireless communications device 30 at the PHY layer 44' to increase signal transmission power, as illustratively shown in FIG. 4. The determination of reduced signal connectivity can be made based upon one or more QoS factors, such as error rate, received signal strength, etc., as will be appreciated by those skilled in the art.

As a result, the transmission area 59' of the MANET 50' is now defined by a circle with a radius $r_2$ greater than the radius $r_1$. Thus, for example, if the source mobile node 51 had initially been communicating with the mobile node 54 and it moves out of range (as in FIG. 3), increasing the signal transmission power causes this node to be within the transmission area 59'.

Of course, the opposite approach may be taken to avoid causing interference to adjacent neighboring mobile nodes unintentionally. Consider the MANET 60 shown in FIG. 5, which illustratively includes a source mobile node 61 and a neighboring mobile node 62 that are interfering with one another. In particular, a transmission from the source mobile node 61 to a mobile node 63-67 causes unintended interference at the mobile node 62. Thus, for example, is the QoS metric indicates that interference from the mobile nodes 62 is causing the QoS threshold not to be met, the controller 31 may determine that the mobile node 61 and 62 these two nodes are interfering with one another and decrease its signal transmission power accordingly. As such, its signal transmission area 68 is reduced from the circle defined by the radius $r_{11}$ (FIG. 5) to a smaller circle defined by a radius $r_{21}$ (FIG. 6), which no longer causes interference to the mobile node 62'.

In addition to signal power, other signal characteristics may be adjusted as well to achieve similar results (i.e., increased inter-node connectivity or reduced interference). For example, in the case illustrated in FIG. 7, the signal transmission antenna pattern (or beam shape) has been changed to exclude the mobile node 62" from the transmission area 68", as illustratively shown. Another similar technique is to adjust signal transmission gain in a desired direction, which also effects the transmission area, as will be appreciated by those skilled in the art.

Furthermore, by adjusting the signal transmission power, signal transmission gain, and/or signal transmission pattern based upon a determination that the QoS metric has fallen below the QoS threshold, the controller 31 may also advantageously adjust the signal transmission range to incorporate more mobile nodes. This may be particularly beneficial when additional routes are needed, or when new nodes join a cluster or groups of nodes, for example.

Other signal characteristics may optionally be adjusted as well to provide improved QoS, at Block 106. For example, the error coding being performed may be changed, as will be appreciated by those skilled in the art. Similarly, the controller 31 may cooperate with the wireless communications device 30 to modulate data using a first modulation technique if the QoS metric is greater than or equal to the QoS threshold, and otherwise using a second modulation technique. By way of example, suitable modulation techniques may include TDMA, CDMA, FDMA, and SDMA, as well as others. Transmission is then performed in accordance with the adjusted signal characteristics, at Block 107, thus concluding the illustrated method (Block 108).

Further still, the controller 31 cooperates with the wireless communications device 30 to transmit data at a desired data rate. As such, the controller 31 may also cooperate with the wireless communications device 30 to adjust the data rate as necessary based upon the available QoS, as will be appreciated by those skilled in the art.

Figure 11:
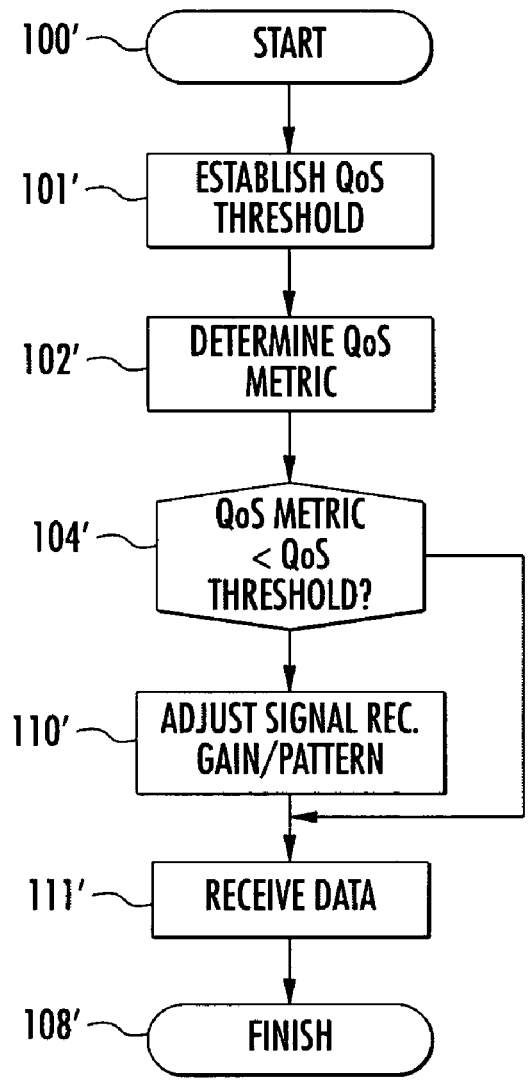

It will also be appreciated that similar techniques may also be used to decrease interference that a particular node receives from an adjacent interfering node. That is, a destination mobile node may determine that the QoS metric for a route over which it is receiving data has fallen below the QoS threshold set at the application layer 36' (which could be provided by the source mobile node, agreed upon by both nodes, or independently established). In such case, the controller 31 can adjust overall signal reception gain and/or a signal reception pattern, for example, as similarly described above, to reduce interference caused by the interfering mobile node when receiving data, at Blocks 110' and 111' (FIG. 11).

In addition, the wireless communications device 30 may also operate over a plurality of channels, illustratively represented by MAC/PHY columns 47a'-47c' in FIG. 2. Thus, if a given route is associated with one of the plurality of channels, the controller 31 may cooperate with the wireless communications device 30 to scout or monitor one or more other available physical channels when a QoS level of the selected route falls below the QoS threshold. Further details on such channel monitoring and selection are provided in U.S. application Ser. No. 10/134,862 filed Apr. 29, 2002 and assigned to the present Assignee, which is hereby incorporated herein in its entirety by reference. Of course, it should be noted that the columns 47a'-47c' could correspond to other physical layer settings or "knobs" as well, such as modulation type, communications mode type, etc.

It will therefore be appreciated by those skilled in the art that the protocol hierarchy of the present invention provides a QoS framework for efficiently and conveniently organizing cooperating QoS operations to provide enhanced QoS. Moreover, the present invention provides a total and integrated framework that allows component-based development for particular application and use scenarios. Further, it also provides for the use of traffic state (e.g., utilization, residual capacity, number of hops, transit delays, etc.) to aid in the production of multiple alternative source-to-destination packet routes.

Moreover, in accordance with the present invention, the radio adaptation layer 42' may advantageously allow the use of multiple radio interfaces (e.g., different radio types, interfaces, physical channels, etc.). Further, the present invention also provides QoS-driven PHY layer adaptation to improve coverage, decrease interference, increase the number of neighboring nodes reached, and improve reliability. Additionally, data packets may be coded at the upper protocol layers to provide greater error correction, etc., as needed, and multiple routes may also advantageously be used to provide greater reliability and throughput, as well as lessening end-to-end delay.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A mobile ad hoc network (MANET) comprising:
a plurality of mobile nodes each comprising a wireless communications device providing a selectable signal transmission pattern and a controller connected thereto;
said controller operating in accordance with a multi-layer protocol hierarchy for,
at an upper protocol layer, establishing a quality-of-service (QoS) threshold,
at at least one intermediate protocol layer below the upper protocol layer, selecting between a unicast communications mode and a multicast communications mode based upon the QoS threshold, and
at a lower protocol layer below the at least one intermediate protocol layer, cooperating with said wireless communications device to transmit data to at least one destination mobile node based upon the selected communications mode and determine a QoS metric for the at least one selected route;
said controller also operating in accordance with the multi-layer protocol hierarchy for,
at the at least one intermediate protocol layer, determining whether the QoS metric falls below the QoS threshold, and
at the lower protocol layer, modulating the data using a first modulation technique if the QoS metric is greater than or equal to the QoS threshold, and otherwise using a second modulation technique.

2. The MANET of claim 1 further comprising:
at the at least one intermediate protocol layer, selecting at least one route to the at least one destination mobile node based upon the QoS threshold; and
at the lower protocol layer, cooperating with said wireless communications device to transmit the data to the at least one destination mobile node via the at least one selected route.

3. The MANET of claim 1 wherein, at the at least one intermediate protocol layer, said controller determines whether to require data reception acknowledgements based upon the QoS threshold.

4. The MANET of claim 1 wherein, at the lower protocol layer, said controller cooperates with said wireless communications device to change at least one signal characteristic based upon a determination that the QoS metric has fallen below the QoS threshold.

5. The MANET of claim 4 wherein the at least one signal characteristic comprises at least one of power, gain, and signal pattern.

6. The MANET of claim 1 wherein, at the at least one intermediate protocol layer, said controller encodes data prior to transmission; and wherein said controller also changes the encoding based upon a determination that the QoS metric has fallen below the QoS threshold.

7. The MANET of claim 1 wherein, at the lower protocol layer, said controller cooperates with said wireless communications device to transmit data at a data rate; and wherein said controller also cooperates with said wireless communications device to change the data rate based upon a determination that the QoS metric has fallen below the QoS threshold.

8. The MANET of claim 1 wherein the upper protocol layer comprises an application layer.

9. The MANET of claim 1 wherein the at least one intermediate protocol layer comprises at least one of a session layer, a transport layer, a network layer, and a radio transport layer.

10. The MANET of claim 1 wherein the lower protocol layer comprises a physical layer.

11. The MANET of claim 1 wherein the QoS threshold is based upon at least one of available bandwidth, error rate, end-to-end delay, end-to-end delay variation, hop count, expected path durability, and priority.

12. A mobile ad hoc network (MANET) comprising:
a plurality of mobile nodes each comprising a wireless communications device providing a selectable signal transmission pattern and a controller connected thereto;
said controller operating in accordance with a multi-layer protocol hierarchy for,
at an upper protocol layer, establishing a quality-of-service (QoS) threshold,
at least one intermediate protocol layer below the upper protocol layer,
selecting at least one route to at least one destination mobile node based upon the QoS threshold,
determining whether a QoS metric for the selected route falls below the QoS threshold, and
selecting between a unicast communications mode and a multicast communications mode based upon the QoS threshold, and
at a lower protocol layer below the at least one intermediate protocol layer, cooperating with said wireless communications device to determine the QoS metric for the at least one selected route, transmit data to the at least one destination mobile node via the at least one selected route based upon the selected communications mode, change at least one signal characteristic based upon a determination that the QoS metric has fallen below the QoS threshold, and modulate the data using a first modulation technique if the QoS metric is greater than or equal to the QoS threshold, and otherwise use a second modulation technique.

13. The MANET of claim 12 wherein, at the at least one intermediate protocol layer, said controller determines whether to require data reception acknowledgements based upon the QoS threshold.

14. The MANET of claim 12 wherein the at least one signal characteristic comprises at least one of power, gain, and signal pattern.

15. The MANET of claim 12 wherein, at the at least one intermediate protocol layer, said controller encodes data prior to transmission; and wherein said controller also changes the encoding based upon a determination that the QoS metric has fallen below the QoS threshold.

16. The MANET of claim 12 wherein, at the lower protocol layer, said controller cooperates with said wireless communications device to transmit data at a data rate; and wherein said controller also cooperates with said wireless communications device to change the data rate based upon a determination that the QoS metric has fallen below the QoS threshold.

17. The MANET of claim 12 wherein the upper protocol layer comprises an application layer.

18. The MANET of claim 12 wherein the at least one intermediate protocol layer comprises at least one of a session layer, a transport layer, a network layer, and a radio transport layer.

19. The MANET of claim 12 wherein the lower protocol layer comprises a physical layer.

20. The MANET of claim 12 wherein the QoS threshold is based upon at least one of available bandwidth, error rate, end-to-end delay, end-to-end delay variation, hop count, expected path durability, and priority.

21. A method for operating a mobile node in a mobile ad hoc network (MANET), comprising a plurality of mobile nodes, in accordance with a multi-layer protocol hierarchy, the mobile node comprising a wireless communications device providing a selectable signal transmission pattern, and the method comprising:

at an upper protocol layer, establishing a quality-of-service (QoS) threshold;

at least one intermediate protocol layer below the upper protocol layer, selecting between a unicast communications mode and a multicast communications mode based upon the QoS threshold;

at a lower protocol layer below the at least one intermediate protocol layer, causing the wireless communications device to transmit data to at least one destination mobile node based upon the selected communications mode, and determining a QoS metric for the at least one selected route;

at the at least one intermediate protocol layer, determining whether the QoS metric falls below the QoS threshold; and at the lower protocol layer, modulating the data using a first modulation technique if the QoS metric is greater than or equal to the QoS threshold, and otherwise using a second modulation technique.

22. The method of claim 21 further comprising:

at the at least one intermediate protocol layer, selecting at least one route to the at least one destination mobile node based upon the QoS threshold; and at the lower protocol layer, causing wireless communications device to transmit the data to the at least one destination mobile node via the at least one selected route.

23. The method of claim 21 further comprising, at the at least one intermediate protocol layer, determining whether to require data reception acknowledgements based upon the QoS threshold.

24. The method of claim 21 further comprising, at the lower protocol layer, causing the wireless communications device to adjust at least one signal characteristic based upon a determination that the QoS metric has fallen below the QoS threshold.

25. The method of claim 24 wherein the at least one signal characteristic comprises at least one of power, gain, and signal pattern.

26. The method of claim 21 further comprising, at the at least one intermediate protocol layer:

encoding data prior to transmission; and changing the encoding based upon a determination that the QoS metric has fallen below the QoS threshold.

27. The method of claim 21 further comprising, at the lower protocol layer:

causing the wireless communications device to transmit data at a data rate; and causing the wireless communications device to change the data rate based upon a determination that the QoS metric has fallen below the QoS threshold.

* * * * *